US008817101B2

(12) United States Patent
Hanisch et al.

(10) Patent No.: US 8,817,101 B2
(45) Date of Patent: Aug. 26, 2014

(54) MOBILE DEVICE AND METHOD FOR MONITORING OF VEHICLES

(75) Inventors: Harald Hanisch, Vienna (AT); Markus Ratz, Vienna (AT)

(73) Assignee: Kapsch TrafficCom AG, Vienna (AT)

(*) Notice: Subject to any disclaimer, the term of this patent is extended or adjusted under 35 U.S.C. 154(b) by 362 days.

(21) Appl. No.: 13/277,534

(22) Filed: Oct. 20, 2011

(65) Prior Publication Data

US 2012/0113262 A1 May 10, 2012

(30) Foreign Application Priority Data

Nov. 4, 2010 (EP) .................................... 10450169

(51) Int. Cl.
*H04N 7/18* (2006.01)
*G08G 1/054* (2006.01)
*G08G 1/017* (2006.01)

(52) U.S. Cl.
CPC .............. *G08G 1/054* (2013.01); *G08G 1/0175* (2013.01)
USPC .......................................................... 348/149

(58) Field of Classification Search
CPC .................................. G08G 1/00; G08G 1/52
USPC .......................................................... 348/149
See application file for complete search history.

(56) References Cited

U.S. PATENT DOCUMENTS 5,515,042 A 5/1996 Nelson
7,262,790 B2 * 8/2007 Bakewell ...................... 348/148
2007/0016372 A1 * 1/2007 Browne et al. ................ 701/213
2008/0077312 A1 3/2008 Mrotek
2008/0273752 A1 * 11/2008 Zhu et al. ...................... 382/103
2011/0140968 A1 * 6/2011 Bai et al. ...................... 342/454

FOREIGN PATENT DOCUMENTS

EP 1 990 655 A1 11/2008

OTHER PUBLICATIONS

Nima Alam, Range and Range-Rate Measurements Using DSRC: Facts and Challenges, Dec., 2009, International Global Navigation Satellite Systems Society, IGNSS Symposium 2009, p. 1 and 9.*
Extended European Search Report for European Patent Application No. 10 450 169.7 dated Mar. 23, 2011, 4pp.

* cited by examiner

*Primary Examiner* — Sath V Perungavoor
*Assistant Examiner* — Kate Luo
(74) *Attorney, Agent, or Firm* — Fiala & Weaver P.L.L.C.

(57) ABSTRACT

A mobile monitoring device including a first sensor for measuring the speed of vehicles passing through a first detection range with a first time stamp; a second sensor for measuring the geometry of vehicles passing through a second detection range with a second time stamp; a camera for recording images of vehicles passing through a third detection range with a third time stamp; and an evaluation device, which calculates from the speed measurement value, first time stamp and first detection range, and from the geometry measurement value, second time stamp and second detection range, the place and time in or at which a passage of the vehicle is to be expected in the third detection range, to determine the matching image on the basis of the third time stamp and third detection range therefrom. The invention additionally relates to such a monitoring method.

17 Claims, 1 Drawing Sheet

MOBILE DEVICE AND METHOD FOR MONITORING OF VEHICLES

CROSS-REFERENCE TO RELATED APPLICATION(S)

This application claims priority to European Patent Application No. 10 450 169.7, filed on Nov. 4, 2010, the contents of which are hereby expressly incorporated by reference.

FIELD OF THE INVENTION

The present invention relates to a mobile monitoring device for monitoring vehicles. The invention additionally relates to a method for such monitoring.

BACKGROUND

In the case of vehicle monitoring, speed measurement values are often combined with recorded images of a vehicle so that this can be clearly identified for enforcement of traffic violations. If such monitoring operations are conducted from a mobile moving monitoring platform, this currently requires complex manual matching of the speed measurement values to the recorded images and vice versa, since the detection ranges of usual speed measurement sensors and image recording cameras never overlap precisely. Because of this and in view of the constantly changing relative speeds in flowing traffic, ambiguities can result between different recorded images and speed measurement values that make an absolute match impossible.

SUMMARY

The present invention provides mobile monitoring devices and methods, which substantially enable vehicles to be monitored in an automated manner in flowing traffic, i.e. both with moving monitoring platforms and moving vehicles to be monitored.

In some embodiments, the invention is a mobile monitoring device that includes a first sensor for measuring speed of vehicles passing through a first detection range, said first sensor providing a speed measurement value of a vehicle with a first time stamp; a second sensor for measuring a geometry of vehicles passing through a second detection range, said second sensor providing a geometry measurement value of the vehicle with a second time stamp; a camera for recording images of vehicles passing through a third detection range, said camera providing an image of the vehicle with a third time stamp; and an evaluation device electrically coupled to the camera and the first and second sensors, and configured for calculating a place and time at which the vehicle is to be expected in the third detection range from the speed measurement value, the first time stamp and the first detection range, and the geometry measurement value, the second time stamp and the second detection range, to determine a matching image on the basis of a corresponding third time stamp, and the third detection range.

In some embodiments, the invention is a method for monitoring vehicles. The method includes measuring a speed of a vehicle passing through a first detection range and providing a speed measurement value with a first time stamp; measuring the geometry of a vehicle passing through a second detection range and providing the geometry measurement value with a second time stamp; recording images of vehicles passing through a third detection range and providing each image with a third time stamp; calculating from the speed measurement value, the first time stamp and the first detection range, and from the geometry measurement value, the second time stamp and the second detection range, the place and time at which a passage of the vehicle is to be expected in the third detection range; and determining a matching image on the basis of a respective third time stamp and third detection range therefrom. The geometry of the vehicle may include the length of the vehicle.

In some embodiments, the invention takes into account the different detection ranges, which the individual sensors and cameras of a mobile monitoring device have, and calculates expected values for the movements of the monitored vehicle within the detection ranges, so that vehicle images recorded in one detection range can be automatically linked with speed measurement values originating from a different detection range therefrom.

In some embodiments, the invention monitors vehicles equipped with dedicated short-range communication onboard units (DSRC) on-board units (OBUs), such as those used as part of DSRC road toll systems, for example. The invention includes a DSRC transceiver for DSRC communication with DSRC OBUs of vehicles passing through a fourth detection range. The DSRC transceiver provides the DSRC communication of each passage of a vehicle with a time stamp. The evaluation device is additionally configured to determine the matching DSRC communication to the determined image on the basis of its time stamp and fourth detection range.

In some embodiments, the invention conducts DSRC communications with the DSRC OBUs of vehicles passing through a fourth detection range, provides each DSRC communication with a time stamp, determines the matching DSRC communication to the determined image on the basis of its time stamp and fourth detection range.

A geometry, for example, the number of axles, length or height of a passing vehicle, can also be detected with a laser scanner. For example, the laser scanner can transmit a scanning beam onto the vehicle in a plane located normal to or on an angle to the direction of travel. From a number of axles or vehicle height detected in such a manner, for example, an associated geometry, e.g. the length, of the vehicle can be determined on the basis of a table of number of axles or vehicle heights and vehicle geometries typically associated therewith. Alternatively, the geometry measurement sensor can be formed by the DSRC transceiver, which receives vehicle data from the DSRC OBU as part of a DSRC communication, from which data it calculates a geometry (e.g., the length) of the vehicle, in which case the second and the fourth detection range are the same. Moreover, the data of the geometry sensor can also be used for further plausibility checks such as determination of a vehicle volume, a vehicle class etc., against which the recorded images, speed measurement values and/or DSRC communications can be counterchecked for plausibility of the match.

DETAILED DESCRIPTION

Figure 1:
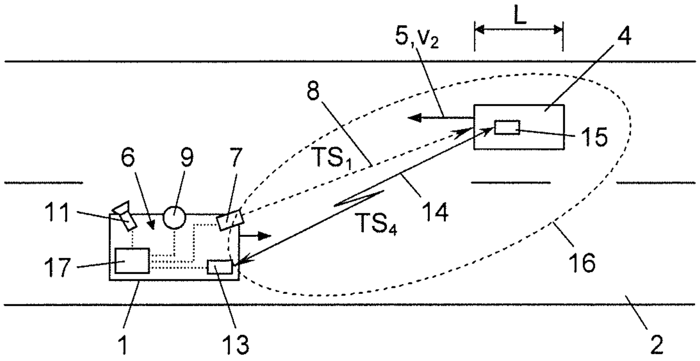
FIGS. 1 to 3 show a mobile monitoring device mounted on a monitoring vehicle for monitoring vehicles in flowing traffic in three different positions of use, according to some embodiments of the present invention.
Figure 2:
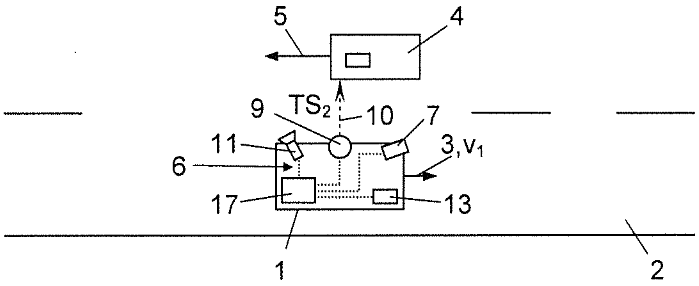
Figure 3:
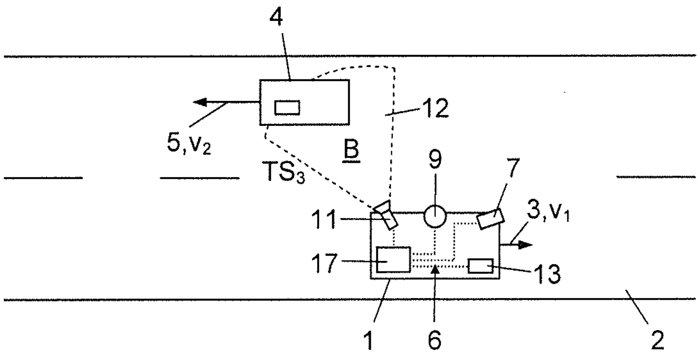

With reference to FIGS. 1 to 3, a monitoring vehicle 1 is respectively shown therein that is moving on a lane of a road 2 in a direction of travel 3 at a speed $v_1$. The monitoring vehicle 1 serves to monitor other vehicles 4 in flowing traffic on the road 2, which in the example shown here are moving in an opposite lane of the road 2 in an opposite direction of travel 5 at a speed $v_2$ and are travelling in oncoming traffic past the monitoring vehicle 1. However, it is understood that the monitoring vehicle 1 can also monitor vehicles 4 travelling in the same direction, or that one or both vehicles 1, 4 can be temporarily at a standstill in stop and go traffic. The different directions of travel 3, 5 and speeds, $v_1$, $v_2$ of the monitoring vehicle 1 and the monitored vehicle 4 create time-variable conditions that render a firm geometric match between the monitoring vehicle 1 and the vehicle 4 impossible.

For monitoring the vehicle 4, the monitoring vehicle 1 carries a mobile monitoring device 6, which comprises the following components, some of which may also coincide:

a first sensor 7 for measuring the relative speed $v_r=v_2-v_1$ of the vehicle 4 in relation to the monitoring vehicle 1 when said vehicle 4 is located in the detection range 8 of the sensor 7 or is passing therethrough;

a second sensor 9, which at least indirectly measures the geometry, here the length L, of the vehicle 4 when this is located in the detection range 10 of the sensor 9;

at least one camera 11 for recording an image B of the vehicle 4 when this is located in the detection range 12 of the camera 11 or is passing therethrough;

an (optional) DSRC transceiver 13, which can conduct a radio communication 14 with an (optional) DSRC OBU 15 of the vehicle 4, when this is located in the detection range 16 of the DSRC transceiver 13 or is passing therethrough;

the detection range 16 is the intersection from the transceiver range of the DSRC transceiver 13 and the transceiver range of the DSRC OBU 15; and an evaluation device 17 connected to the above components.

During operation, the sensor 7 measures the (relative) speed $v_r$ of the passing vehicles 4 and provides each speed measurement value $v_r$ with a respective time stamp $TS_1$ of the time at which it was detected. With knowledge of the inherent speed $v_1$ of the vehicle 1, conclusions can be made from the relative speed $v_r$ as to the inherent speed $v_2$ of the vehicle 4.

In the same way, the sensor 9 measures at least one geometry of the passing vehicles 4, for example, the length L, and provides each geometry measurement value L with a time stamp $TS_2$ of the time at which it was measured. The camera 11 photographs the vehicles 4 passing through its detection range 12 and provides each recorded image with a time stamp $TS_3$ of the time at which it was detected. Optionally, the DSRC transceiver 13 conducts DSRC communications 14 with the DSRC OBU 15 of the passing vehicles 4 and stores each conducted DSRC communication 15 with a time stamp $TS_4$ of when it was conducted.

DSRC OBUs are used in DSRC road toll systems to conduct DSRC communications with roadside radio beacons (roadside equipment, (RSE)). The DSRC communications ultimately end in toll transactions in the road toll system. Mobile monitoring platforms are also used for monitoring vehicles with DSRC OBUs and these interrogate the DSRC OBUs of the vehicles in flowing traffic to retrieve data therefrom for monitoring of the toll transactions generated in the road toll system, or simply to check the presence of a operable DSRC OBU in a vehicle. This type of monitoring poses the additional problem that the transmit-receive ranges of the DSRC transceiver of the mobile monitoring device and the DSRC OBU of the monitored vehicle in its overlap range necessary for the radio communication form a detection range that can differ greatly from the detection ranges of the other sensors and cameras of the mobile monitoring device. This then results in a problem of matching between the DSRC radio communications, on the one hand, and the images recorded for enforcement purposes, on the other. The invention solves this problem by calculating expected values for the time and place when or where a vehicle, with which a DSRC communication has been conducted, is in the detection range of the camera to enable a clear match of an image to a DSRC communication.

It is understood that in this embodiment the determination of the speed measurement value is possibly only an interim result on the way to matching the DSRC communications to the images, i.e. does not represent an output signal or result of the monitoring device or monitoring method itself, but merely serves to calculate the said expected values and thus match the DSRC communications to the images.

The evaluation device 17 links the speed measurement values, geometry measurement values, camera images and DSRC communications received from the sensors 5, 9, the camera 11 and the optional DSRC receiver 13 taking their respective time stamps $TS_1$-$TS_4$ and detection ranges 8, 10, 12, 16 into account, so that they can be matched to one another. Since the respective detection ranges 8, 10, 12 and 16 are known in relation to the coordinate system of the monitoring device 6, for example, defined by spatial angle, planes, sectors etc., from the speed measurement values, geometry measurement values, camera images and/or DSRC communications occurring at the respective times $\mathbf{15}_1$, $\mathbf{15}_2$, $\mathbf{15}_3$, and $\mathbf{15}_4$, expected values can be calculated for the place and the time, in or at which a passage of a vehicle attributable to the vehicle 4 occurs in the detection range 12 of the camera 11, so that the images B recorded by the camera 11 in the detection range 12 with their time stamps $TS_3$ can be compared therewith. Thus, the respective matching image B to each speed measurement value $v_r$ can be determined and vice versa, even when the detection ranges 8, 12 of the speed sensors 7 and the camera 11 do not overlap. The vehicle geometry, in particular, the number of axles A and/or the vehicle length L, is also evaluated therewith to exclude ambiguities, for example to validate a vehicle 4 recorded in an image B on the basis of its length detected in the image compared to the length L measured by the sensor 9, or to distinguish between several vehicles 4, which were recorded in the very same image B because of dense traffic.

The speed of the vehicles can in fact be measured on any manner known in the art. According to a first preferred embodiment of the invention that is intended for the DSRC systems, the speed is measured using the DSRC transceiver of the mobile monitoring device itself, that is preferably by Doppler measurement of the DSRC communications, i.e. evaluation of the relative speed-based Doppler effect that occurs in the radio communication. Accordingly, in this embodiment the first and the fourth detections areas are the same, because the speed measurement sensor is formed by the DSRC transceiver itself. Installation of a separate speed measurement sensor becomes unnecessary as a result of this embodiment.

The invention is also suitable for vehicles that are not equipped with DSRC OBUs, the speed is measured with a laser scanner from the mobile monitoring device, or by evaluating two consecutive images of a camera.

In some embodiments, the speed measurement value $v_r$ or $v_2$ of the vehicle 4 determined in this manner can also be used only as an interim result on the way to matching a DSRC communication 14 to a recorded image B. Thus, with knowledge of the detection range 16 of the DSRC transceiver 13, the aforementioned speed and geometry measurement values of the sensors 7, 9, the detection ranges 8, 10 and the time stamps $TS_1$-$TS_4$, a DSRC communication with a vehicle 4 can also be matched to the respective image B of the vehicle 4. The measured or calculated speed vector $v_2$ of the vehicle 4 and the known speed vector $v_1$ of the monitoring vehicle 1 are evaluated, for example, in association with the respective time stamps $TS_1$-$TS_4$ and detection ranges 8, 10, 11, 12, 16 in order to estimate or extrapolate the place and time in or at which the vehicle 4, with which a DSRC communication 14 took place, should appear in the detection range 12 of the camera 11 in order to match the image B of the camera 11, wherein the time stamp $TS_3$ and the position of the vehicle 4 recorded in the image B matches these detection values.

The term "detection range" used here covers every segment of surrounding area that can be covered by means of sensors or cameras from the current location of the mobile monitoring device, whether this is a conical, pyramid-shaped, prismatic, linear, plane etc. segment of area or the like.

The calculation can also be conducted as post-processing, i.e. the detection ranges or time stamps can also be assigned after all individual measurements have been conducted and stored.

The use of further sensors, the sensor data of which are matched to the respective passing vehicle by the described method, is also conceivable in principle: exhaust gas sensors, sound volume sensors, temperature sensors for tyre or brake inspection, video sensors for tyre inspection, hazardous transport load markings, badges, stickers etc.

All images mentioned here can also each be a component of a video sequence.

Any sensors known in the art can be used for the speed measurement sensor 7 and the geometry measurement sensor 9. In a first embodiment a laser scanner is used for the geometry measurement sensor 9 that, for example, transmits a scanning beam in a plane located normal to or on an angle to the direction of travel, i.e. its detection range 10 is a plane, and the vehicle 4 is scanned by the motion of the monitoring vehicle 1 and/or vehicle 4 in order to generate a 3D image of the vehicle 4.

The vehicle length L is frequently represented in a distorted manner in such a 3D image of the vehicle 4 because of the vehicle speed $v_2$. In this case, the vehicle length L can be determined indirectly therefrom. Accordingly, from a correctly detected vehicle height (or the vehicle volume), for example, a conclusion can be drawn as to a specific class of vehicle such as automobile, truck, truck with trailer etc., for which specific typical vehicle lengths L can be determined. In this case, the sensor 9 may contain, for example, a table of typical vehicle heights and associated typical vehicle lengths and can thus determine an appropriate length L of the vehicle 4 on the basis of the measured vehicle height.

Alternatively, the sensor 9 could be a 3D laser scanner which very quickly quasi photographically provides a 3D image of a matching vehicle 4 in one action, from which a geometry, such as the vehicle length L, can be directly determined.

In some embodiments, the sensor 9 determines the number of axles A of the vehicle 4, for example by laser scanning or LIDAR or radar Doppler measurement of the rotating wheels of the vehicle 4. The sensor 9 can then again contain a table of vehicle lengths L or dimensions typical for specific numbers of axles A, for example, and thus determine an associated geometry such as the length L of the vehicle 4.

The speed measurement sensor 7 can also be formed by a laser scanner, for example in the manner of a LIDAR speed measurement gun. Alternatively, the speed of the vehicle 4 could also be measured with a 2D or 3D laser scanner, for example by means of two measurements in quick succession and determination of the local displacement of the vehicle 4 between the two measurements. Therefore, the same laser scanner can optionally be used for both the speed measurement sensor 7 and for the geometry measurement sensor 9.

In some embodiments, the speed can also be measured with the aid of the optional DSRC transceiver 13. Doppler measurements can be conducted on the DSRC communications 14, for example, to determine the relative speed $v_r$. Alternatively the speed can be measured using a transceiver 13 with infrared transmission during the course of the vehicle communication.

Furthermore, the DSRC OBU 15 may measure its speed itself and sends the results to the DSRC transceiver 13 as part of a DSRC communication 14, which is also covered in the definition here that the DSRC transceiver 13 forms a speed measurement sensor.

If the speed is measured with the DSRC transceiver 13, it is understood that the first and the fourth detection range 8 and 16 coincide.

Moreover, the DSRC transceiver 13 can also form the geometry measurement sensor 9, if as part of a DSRC radio communication 14 it receives vehicle data from the DSRC OBU 15, from which it can calculate a geometry of the vehicle 4, for example the length L. For instance, the DSRC OBU 15 transmits information concerning the vehicle class or number of axles of the vehicle 4, from which (by way of a table of typical vehicle geometries for typical vehicle classes or numbers of axles), the associated vehicle geometry can be calculated. If the geometry measurement sensor 9 and the DSRC transceiver 13 coincide, it is understood that the detection ranges 10, 16 also coincide accordingly.

Alternatively, the transceiver 13 can also be configured for a short-range transmission technology other than DSRC, for example infrared or any desired microwave technology.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A mobile monitoring device for monitoring vehicles, comprising:

a first sensor for measuring speed of vehicles, including a vehicle, passing through a first detection range, said first sensor providing a speed measurement value of the vehicle with a first time stamp corresponding to a first time;

a second sensor for measuring a geometry of vehicles, including the vehicle, passing through a second detection range, said second sensor providing a geometry measurement value of the vehicle with a second time stamp corresponding to a second time;

a camera for recording images of vehicles, including the vehicle, passing through a third detection range, said camera providing an image of the vehicle with a third time stamp corresponding to a third time, wherein the first time is a different than the third time; and an evaluation device electrically coupled to the camera and the first and second sensors, and configured for calculating a place and time at which the vehicle is to be expected in the third detection range from the speed measurement value, the first time stamp and the first detection range, and the geometry measurement value, the second time stamp and the second detection range, to determine a matching image for the vehicle from the recorded images on the basis of a corresponding third time stamp and the third detection range.

2. The mobile monitoring device according to claim 1, wherein the vehicles are equipped with dedicated short-range communication (DSRC) onboard units (OBUs), further comprising:

a DSRC transceiver for DSRC communication with the DSRC OBUs of vehicles passing through a fourth detection range, said DSRC transceiver providing the DSRC communication of each passage of the vehicle with a fourth time stamp, wherein the evaluation device is additionally configured to determine a matching DSRC communication to the determined matching image on the basis of the fourth time stamp and fourth detection range.

3. The mobile monitoring device according to claim 2, wherein the first and the fourth detection ranges are the same, and the first sensor is formed by the DSRC transceiver.

4. The mobile monitoring device according to claim 1, wherein said geometry is a length of the vehicle.

5. The mobile monitoring device according to claim 1, wherein the first sensor is formed by a laser scanner.

6. The mobile monitoring device according to claim 2, wherein the second and fourth detection ranges are the same, and the second sensor is formed by the DSRC transceiver, which receives vehicle data from the DSRC OBU as part of a DSRC communication, from which the DSRC transceiver calculates said geometry of the vehicle.

7. The mobile monitoring device according to claim 1, wherein the second sensor is formed by a laser scanner.

8. The mobile monitoring device according to claim 7, wherein the laser scanner is configured to detect a vehicle height or a number of axles, from which the laser scanner determines said geometry of the vehicle on the basis of a table of vehicle heights or number of axles and associated vehicle geometries.

9. A method for monitoring vehicles comprising:

measuring a speed of a vehicle passing through a first detection range and providing a speed measurement value with a first time stamp corresponding to a first time;

measuring a geometry of the vehicle passing through a second detection range and providing a geometry measurement value with a second time stamp corresponding to a second time;

recording images of vehicles passing through a third detection range and providing each image with a third time stamp corresponding to a third time, wherein the first time is different than the third time;

calculating from the speed measurement value, the first time stamp and the first detection range, and from the geometry measurement value, the second time stamp and the second detection range, a place and time at which a passage of the vehicle is to be expected in the third detection range; and determining a matching image for the vehicle from the recorded images on the basis of a respective third time stamp and third detection range therefrom.

10. The method according to claim 9, wherein the vehicles are equipped with dedicated short-range communication onboard units (DSRC) on-board units (OBUs), the method further comprising:

performing a DSRC communication with the DSRC OBUs of vehicles passing through a fourth detection range and providing each DSRC communication with a fourth time stamp; and determining a matching DSRC communication for the determined image on the basis of the fourth time stamp and fourth detection range.

11. The method according to claim 10, wherein the first and the fourth detection ranges are the same and the speed is measured by Doppler measurement of the DSRC communication.

12. The method according to claim 10, wherein the second and fourth detection ranges are the same, and vehicle data from the DSRC OBU are received as part of a DSRC communication, from which said geometry of the vehicle is calculated.

13. The method according to claim 9, wherein the geometry is a length of the vehicle.

14. The method according to claim 9, wherein the speed is measured with a laser scanner or by evaluation of two consecutive images of a camera.

15. The method according to claim 9, wherein the geometry is measured with a laser scanner.

16. The method according to claim 15, wherein a height of the vehicle is detected with the laser scanner and said geometry of the vehicle is determined according to the detected height, and on the basis of a table of vehicle heights and associated vehicle geometries.

17. A travelling monitoring vehicle for performing the method of claim 9.

* * * * *